March 28, 1961
D. RUSHMORE
2,976,719
PAPER CONTAMINATION CLASSIFIER
Filed Oct. 23, 1956
2 Sheets-Sheet 1
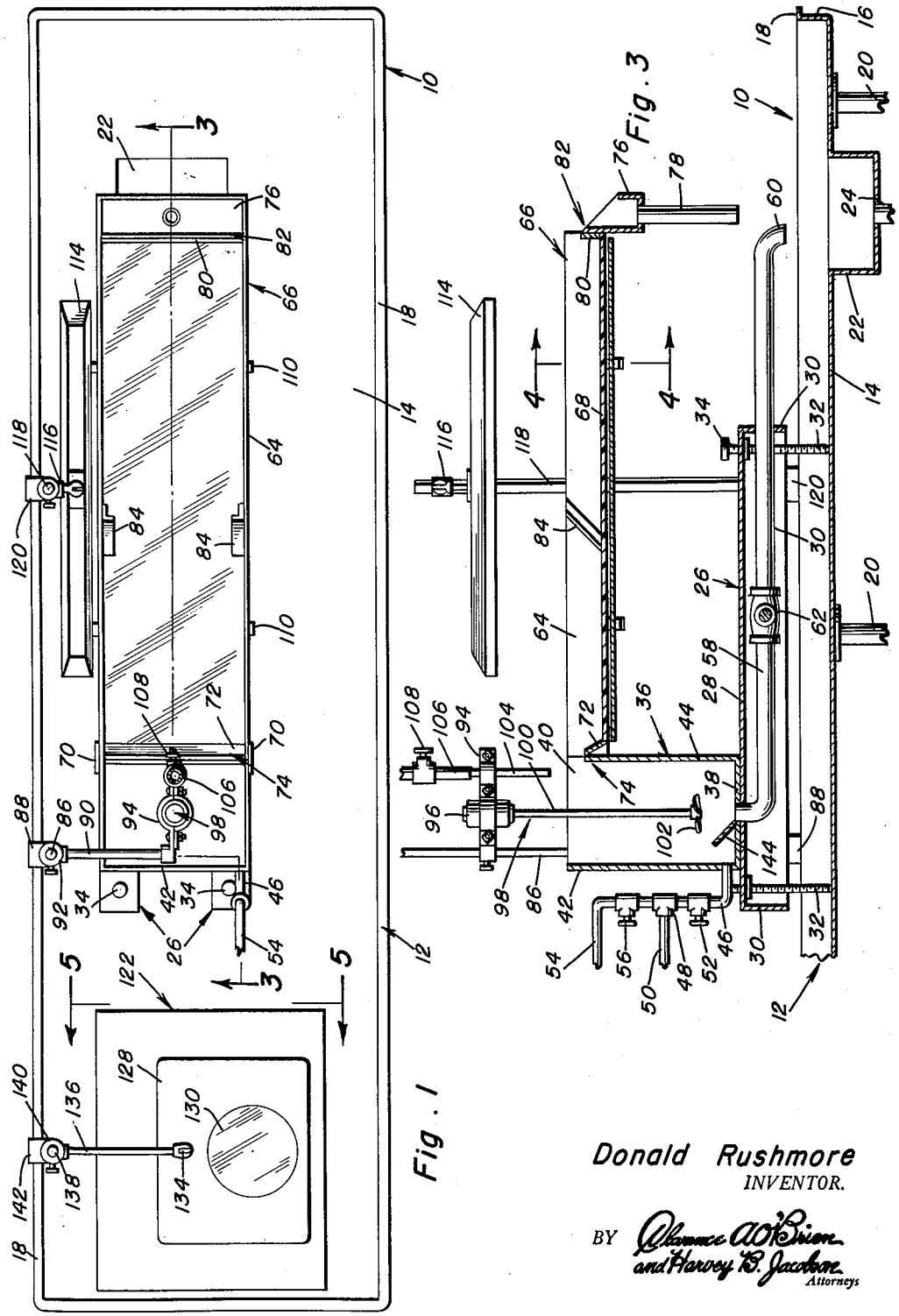
Donald Rushmore
INVENTOR.
BY March 28, 1961
D. RUSHMORE
2,976,719
PAPER CONTAMINATION CLASSIFIER
Filed Oct. 23, 1956
2 Sheets-Sheet 2
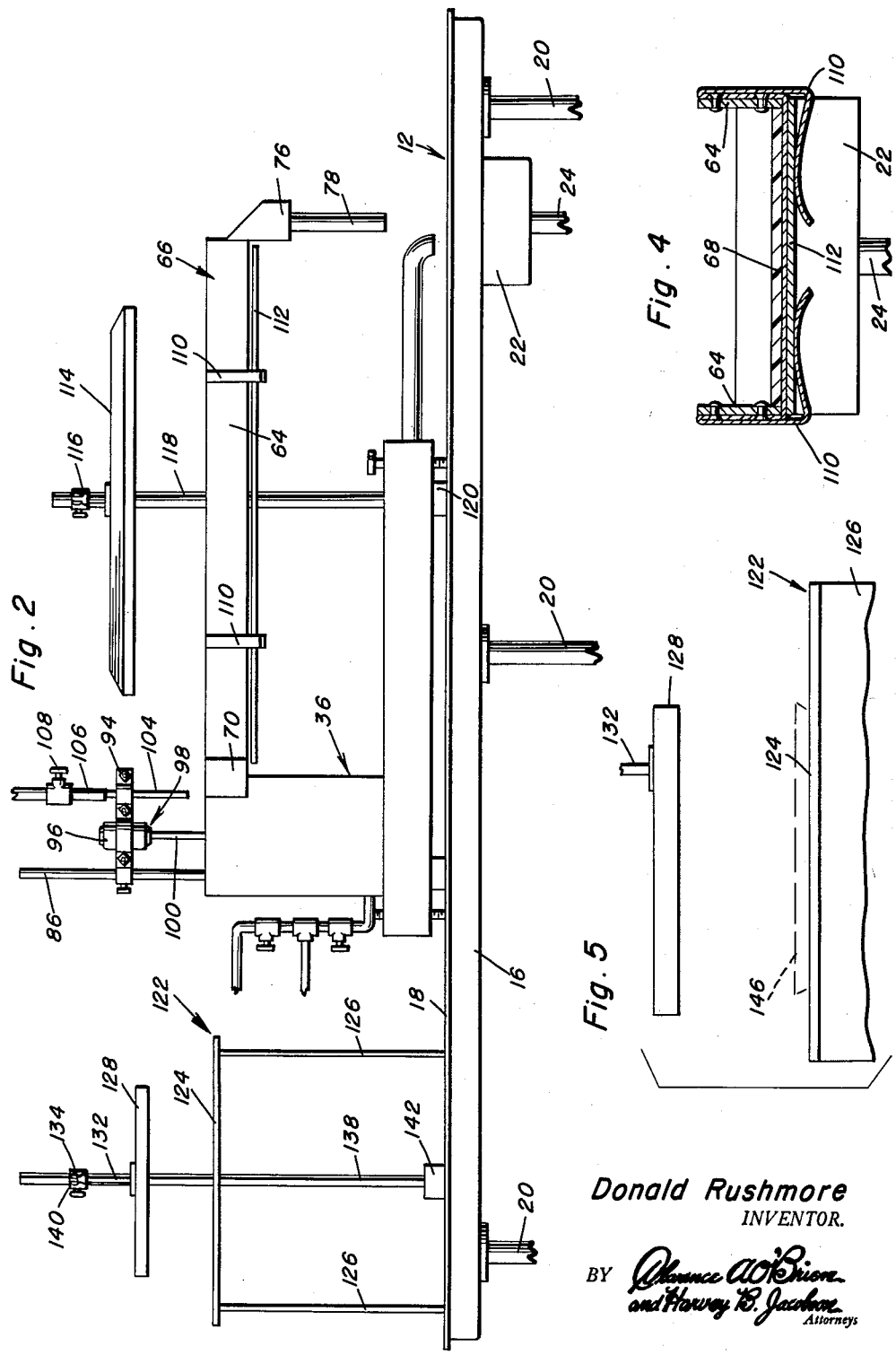
Donald Rushmore
INVENTOR.

United States Patent Office 2,976,719
Patented Mar. 28, 1961

2,976,719
PAPER CONTAMINATION CLASSIFIER
Donald Rushmore, Wanakena, N.Y.
Filed Oct. 23, 1956, Ser. No. 617,759
5 Claims. (Cl. 73—61)

This invention relates in general to new and useful improvements in testing apparatus, and more specifically to an apparatus and process for determining the existence of and quantity of specific foreign matter in paper stock.

At the present time paper mills have insufficient control over the contents of the paper stock when utilizing reclaimed paper. As a result, at times an entire batch of paper is run off only to find that the paper is of an inferior grade and unsalable. Such paper is a complete loss to the mill making it and it would have been much cheaper if the paper stock had been discarded in the pulp stage. This is particularly true of paper manufactured from reclaimed fiber by the de-inking process. The paper contains rubber which in many instances is excessive.

It is therefore the primary object of this invention to provide an improved paper contamination classifier which is of such a nature whereby a sample taken from paper stock may be readily examined so that the amount of foreign matter may be quickly determined and the paper stock discarded in the pulp stage in the event the foreign matter is excessive.

Another object of this invention is to provide improved apparatus for determining the amount of contamination in paper stock, the apparatus being of such a nature whereby a sample may be placed therein and quickly disposed in such a manner whereby foreign matter may be selected therefrom by a visual inspection and such foreign matter rechecked so as to determine the amount of the foreign matter which would be harmful to the finished paper product and thus permit the paper mill to determine in advance whether the paper stock will make the desired grade of paper and if not to discard such paper stock.

Another object of this invention is to provide an improved paper contamination classifier which includes a simple apparatus in the form of a mixing tank in which a sample of paper stock may be placed and mixed with water to form a thin solution for easy inspection and removal of contaminate, and an inspection tank where the thin paper stock solution may be deposited in a relatively thin layer so that foreign matter carried by the paper stock may be visually picked therefrom, the apparatus being provided with suitable reflectors which permit either light or dark foreign matter to be removed from the paper stock as desired.

A further object of this invention is to provide an improved process of determining the contamination of the paper stock, the process being of such a nature whereby one may visually pick from a paper stock sample foreign matter which is considered harmful to the particular grade of paper being manufactured.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the testing apparatus which is the subject of this invention and shows the general arrangement of components thereof;

Figure 2 is a front elevational view of the testing apparatus of Figure 1 with the legs of a supporting table being broken away;

Figure 3 is a longitudinal sectional view taken substantially upon the plane indicated by the section line 3—3 taken throughout the portion of the testing apparatus utilized for the first stage of the test and shows the specific details of the various tanks thereof;

Figure 4 is an enlarged fragmentary transverse sectional view taken substantially on the plane indicated by the section line 4—4 of Figure 3 and shows the manner in which a reflector is secured to the underside of an inspection tank; and Figure 5 is a fragmentary sectional view taken substantially upon the plane indicated by the section line 5—5 of Figure 1 and shows the general details of an apparatus for more closely examining foreign matter removed from paper stock.

Referring now to the drawings in detail, it will be seen that there is illustrated the paper contamination classifier which is the subject of this invention, the classifier being referred to in general by the reference numeral 10. The classifier 10 includes a table which is referred to in general by the reference numeral 12. The table 12 includes a table surface 14 which is bounded by an upstanding peripheral flange 16 which terminates in an outturned rim 18. The table 12 is secured in place at a desired level by a plurality of legs 20 which are connected to the underside of the table surface 14.

Inasmuch as there will be a quantity of water used in conjunction with the classifying of foreign matter in paper stock, and in order to facilitate the disposal of such water and paper stock samples, the table 12 is provided with a sump 22. The sump 22 is disposed adjacent the right hand end of the table 12 and is provided with a drain pipe 24 which will go to a suitable sewer connection (not shown).

Positioned on the table 12 at approximately the center thereof is a supporting base which is referred to in general by the reference numeral 26. The supporting base 26 includes an upper plate 28 which is reinforced by downturned peripheral flanges 30. The lower edges of the flanges 30 are disposed above the upper surface of the table surface 14 and the supporting base 26 is supported relative to the table 12 by means of a plurality of leveling screws 32. The leveling screws 32 are adjustably carried by the plate 28 and are provided with knurled heads 34 to facilitate rotation thereof. The leveling screws 32 serve to level the supporting base 26 as is desired.

Secured to the left end of the supporting base 26, as viewed in Figure 3, is an upright mixing tank 36. The mixing tank 36 includes a bottom wall 38 which is set upon the plate 28 of the supporting base 26 and suitably secured thereo. The mixing tank 36 also includes side walls 40, a left end wall 42 and a right end wall 44.

In order that water may be supplied to the mixing tank 36, there is connected to the lower part of the end wall 42 a water supply line 46. The water supply line 46 is in turn connected by means of a T-fitting 48 to a water supply pipe 50. Flow of water through the water supply line 46 into the mixing tank 36 is controlled by a valve 52.

The water supply system also includes a water line 54 which is for the purpose of supplying water to the classifier 10 for the general purpose of cleaning up after a test has been run. Flow of water through the line 54 is controlled by means of a valve 56 and the line 54 is connected to the water supply pipe 50 by the T-fitting 48.

The mixing tank 36 is also provided with a drain line 58. The drain line 58 passes upwardly through the plate 28 in the bottom wall 38 and is communicated with the interior of the mixing tank 36. The drain line 58 has a discharge end 60 which is aligned with the sump 22. Flow through the discharge line 58 is controlled by means of a valve 62.

Secured to the upper parts of the side walls 40 and extending longitudinally of the table 12 therefrom are side walls 64 of an inspection tank 66. The inspection tank 66 is in the form of a relatively shallow tray and has a transparent bottom wall 68 which is preferably formed of a plastic material. The connection between the side walls 64 and the side walls 40 is reinforced by straps 70 which are suitable secured to the side walls 40 and 64 preferably by welding.

It is to be noted that the end wall 44 terminates below the upper edges of the remaining walls of the mixing tank 36 and has connected thereto a downwardly sloping end wall 72 of the inspection tank 66. The upper portion of the end wall 44 together with the end wall 72 forms an inlet dam which is referred to by the reference numeral 74.

Disposed at the right hand end of the inspection tank 66 as illustrated in Figure 3, is a catch basin 76. The catch basin 76 includes a drain pipe 78 which is aligned with the sump 22 for delivering water and paper stock to the sump 22. The catch basin 76 is carried by a right hand end wall 80 of the inpspection tank 66. The right hand end wall 80 together with a portion of the catch basin 76 forms an outlet dam 82.

Normally the entire length of the inspection tank 66 will be utilized. However, if it is desired to utilize only a part of the inspection tank 66, an intermediate dam may be placed across the inspection tank 66 between the side walls 64 thereof. The intermediate dam will be supported by suitable guides 84 which are secured to the opposed inner faces of the side walls 64.

Secured to the rim 18 along the rear edge of the table 12 is an upright support 86, the upright support 86 being clamped in place by means of a clamp 88. Extending transversely of the table 12 and vertically adjustably positioned on the upright support 86 is a horizontal support arm 90. The support arm 90 is secured to the upright support 86 by a clamp 92.

The support arm 90 has a forward end terminating in alignment with the center of the inspection tank 66 and carries a bracket 94. The bracket 94 supports an electric motor 96 of a mixer 98. The mixer 98 includes a shaft 100 which extends down into the mixing tank 36 and which terminates in an agitator 102.

Also carried by the mounting bracket 94 is a discharge pipe 104 of a supply line 106 for a suitable foam killer agent. Flow of the foam killer into the mixing tank 36 is controlled by means of a valve 108.

In order that foreign matter may be readily detected in a paper stock sample disposed in the inspection tank 66, there is carried by the side walls 64 of the inspection tank 66 suitable spring clips 110 which are best illustrated in Figure 4. The spring clips 110 support in underlying relation to the bottom wall 68 a reflector 112. The reflector 112 may either be replaceable or reversible so as to selectively present either a dark surface or a light surface as is desired depending upon the particular foreign mater to be removed from paper stock.

In order to facilitate the illumination of the paper stock in the inspection tank 66, there is provided a fluorescent light fixture 114. The fluorescent light fixture 114 is supported by means of a bracket 116 adjustably mounted on an upright support 118. The upright support 118 is secured to the rim 18 of the table 12 along the rear edge thereof by means of a suitable clamp 120.

Disposed to the left of the mixing tank 36 is a sample support which is referred to in general by the reference numeral 122. The sample support 122 includes a table portion 124 which is supported by a pair of upright plates 126.

Overlying the table portion 124 is an illuminated magnifier 128 which includes a lens portion 130. The illuminated magnifier 128 is supported by a depending arm 132 which is in turn connected by a fitting 134 to a horizontal support arm 136. The horizontal support arm 136 is adjustably connected to an upright support 138 by means of a clamp 140. The lower end of the upright support 138 is adjustably clamped to the rim 18 at the rear edge of the table 12 by means of a clamp 142.

Although no electrical connections to the mixer 98, the fluorescent light fixture 114 and the illuminated magnifier 128 have been illustrated, it is to be understood that suitable electrical connections will be provided for the table 12 and that the components of the classifier 10 will be connected to these electrical connections.

In the use of the classifier 10, a sample of paper stock, for example de-inked stock, representing 20 grams of dry fibers is taken from the pulper or cook tank. With the batch run at 6% consistency of this represents 333 cc. This stock is placed in the mixing tank 36 and water is added by opening the valve 52 to bring the level of the water and paper stock to within one inch of the dam 74. Incidentally, water entering into the mixing tank 36 has the flow thereof controlled by means of a baffle 144 carried by the bottom wall 38, as is best illustrated in Figure 3.

After the desired quantity of water has been placed in the mixing tank 36, the mixer 98 is actuated so as to thoroughly mix the paper stock with the water. If necessary, foam killer is added to the sample by opening the valve 108.

After the desired agitation of the sample has been completed, the valve 52 is again opened to cause the paper stock samples to flow over the inlet dam 74 and into the inspection tank 66. The paper stock sample slowly flows the length of the inspection tank 66 at a depth of approximately one-quarter inch bringing every fiber and every particle of the paper stock sample into easy view for inspection.

All substances harmless to the system such as broken specks, coating chips, etc., are ignored. However, all unknown or harmful particles are picked out with a wire spoon and desposited in a black or white sample dish, such as the sample dish 146 illustrated in Figure 5. If desired, a small support may be removably attached to the rear part of the inspection tank 66 to support the sample dish 146 at this time. When the mixing tank 36 is clear, the water is shut off and the sample dish is placed upon the table portion 124 under the illuminated magnifier 128. At this time the foreign matter is more closely inspected and the particles are taken out individually with tweezers and examined under the magnifier. The various types of rubber are very easily identifiable and they are accurately counted and recorded. If the count is below the danger point the pulper is accepted and put into the system. If the count is definitely over the limit, the entire batch of paper stock is emptied into the sewer.

In the event the initial count is questionable, a second sample may be run through the classifier 10 and a screen placed under the outlet of the catch basin 76 so that a recheck can be made if there is still doubt.

If the flow from the various chests in the system are charted, the rubber count obtained in this process can be directly linked to the condition of the finished paper. By keeping such records, it is possible to spot "rubbery" carloads of waste paper and find evidence for car rejection.

It is to be understood that the contaminator 10 is not limited to determination of rubber content of paper stock, but may be used to determine the existence of all types of foreign matter in paper stock.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A contamination classifier for paper stock comprising an inspection tank, an inlet dam and an outlet dam at opposite ends of said inspection tank, said inspection tank being in the form of a shallow horizontally disposed tray having a continuous upstanding border, said dams being lower than said upstanding border, a mixing tank for supplying a paper stock sample to said inspection tank, said inlet dam connecting said mixing tank and said inspection tank and forming an upper overflow rim of the mixing tank, a water inlet in the lower part of said mixing tank for floating a paper stock sample therein, whereby said paper stock may overflow from said mixing tank into said inspection tank in a thin layer, and a discharge pipe adjacent said outlet dam.

2. The classifier as defined in claim 1 wherein said inspection tank is secured to said mixing tank and supported thereby in cantilever fashion.

3. The classifier as defined in claim 2, wherein said inspection tank includes a transparent bottom and a removable reflector underlying said bottom and secured thereto by clip means.

4. The classifier as defined in claim 1, wherein a baffle means is connected to and disposed within said mixing tank adjacent said water inlet for preventing turbulence due to water flow into said mixing tank.

5. A contamination classifier for paper stock comprising an inspection tank, an inlet dam and an outlet dam at opposite ends of said inspection tank, said inspection tank being in the form of a shallow horizontally disposed tray having a continuous upstanding border, said dams being lower than said border, a mixing tank for supplying a paper stock sample to said inspection tank, said inlet dam connecting said mixing tank and said inspection tank and forming an upper overflow rim of the mixing tank, a water inlet in said mixing tank for floating a paper stock sample therein, whereby said paper stock may overflow from said mixing tank into said inspection tank in a thin layer and flow down the length of the tray due to gravity from the inlet dam to the outlet dam, and a discharge means adjacent said outlet dam.

References Cited in the file of this patent

UNITED STATES PATENTS

| | | |
|---|---|---|
| 92,594 | Eltonhead | July 13, 1869 |
| 247,077 | Lodwick | Sept. 13, 1881 |
| 1,822,604 | Simons et al. | Sept. 8, 1931 |
| 1,859,035 | Hall | May 17, 1932 |
| 2,068,476 | Thomas | Jan. 19, 1937 |
| 2,161,594 | Ruth | June 6, 1939 |
| 2,759,391 | Lehman | Aug. 21, 1956 |